April 28, 1970 W. D. HOUGH 3,508,295
APPARATUS FOR BLOW MOLDING A CONTAINER
HAVING AN OFFSET SPOUT
Original Filed Sept. 1, 1966 3 Sheets-Sheet 1
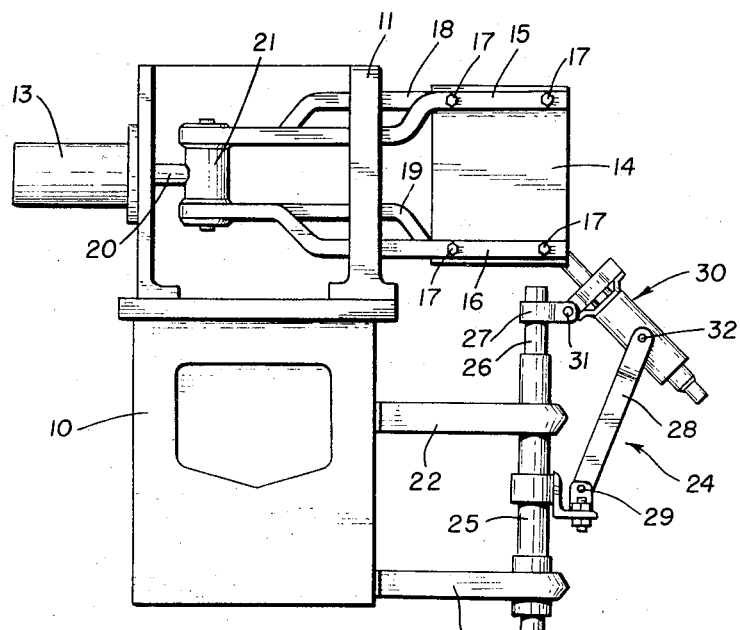
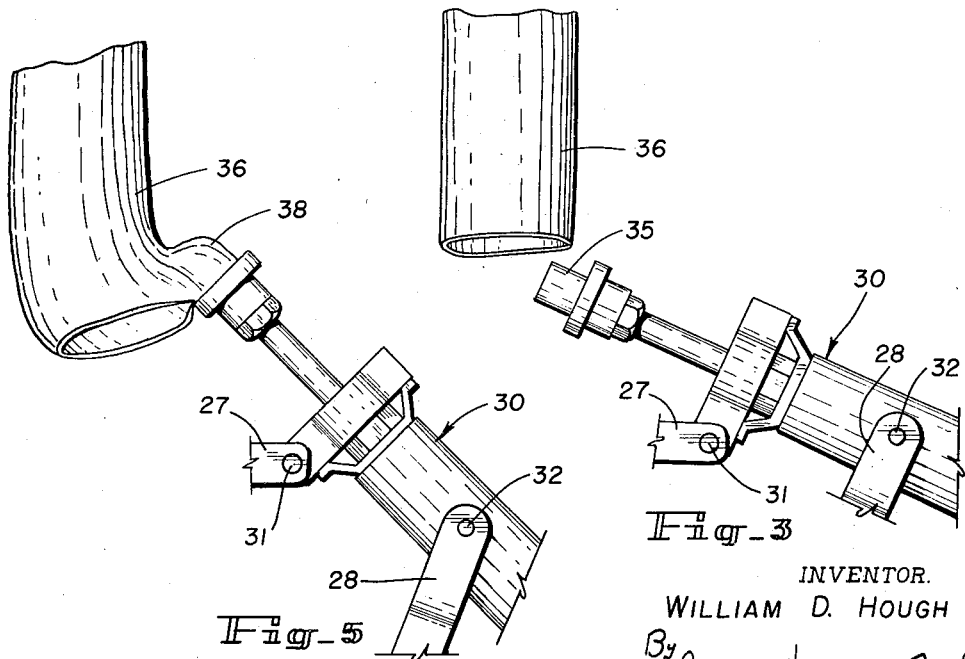
INVENTOR.
WILLIAM D. HOUGH
By Campbell, Harris and O'Rourke
ATTORNEYS

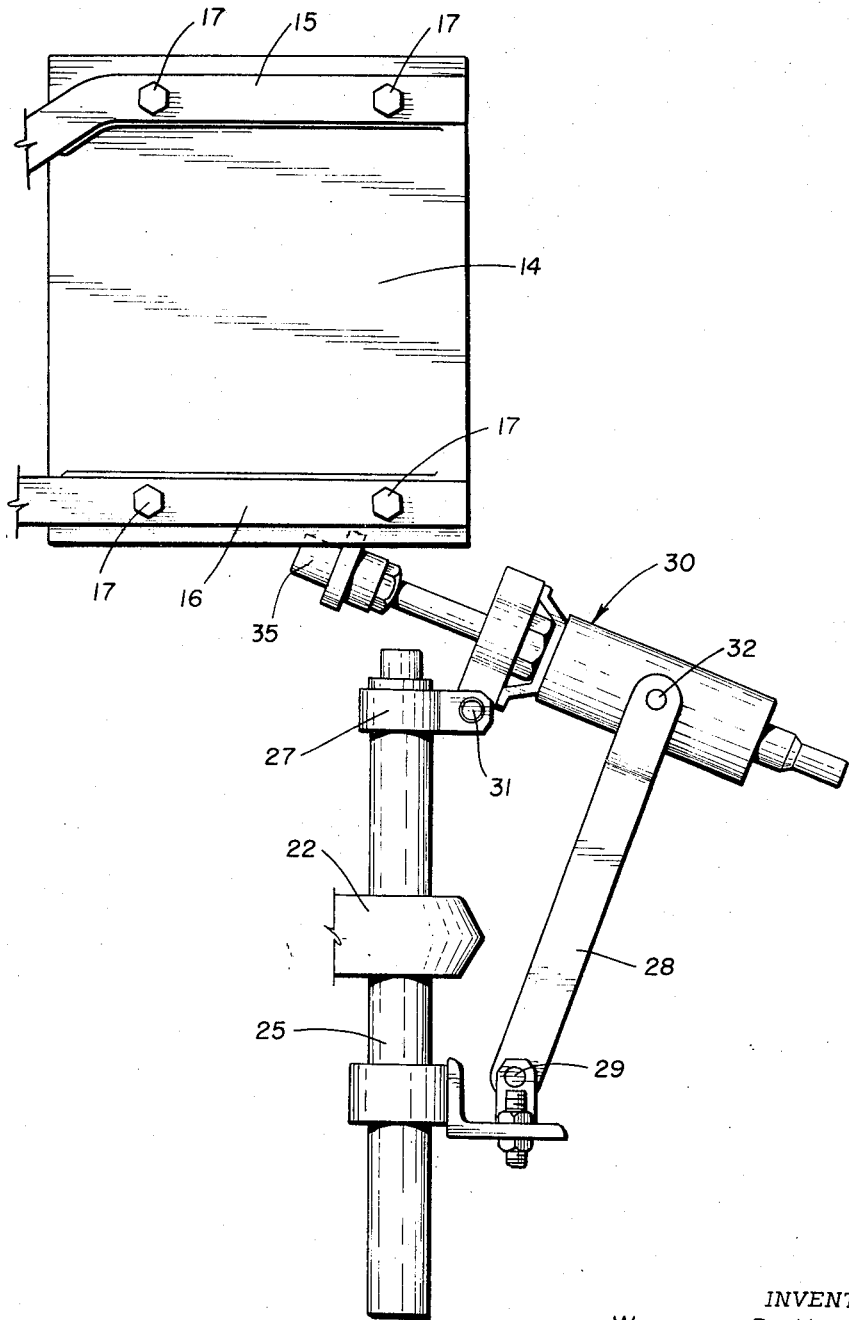

3,508,295
APPARATUS FOR BLOW MOLDING A CONTAINER HAVING AN OFFSET SPOUT
William D. Hough, Arvada, Colo., assignor to Ball Brothers Company Incorporated, Muncie, Ind., a corporation of Indiana
Original application Sept. 1, 1966, Ser. No. 576,605. Divided and this application Dec. 24, 1968, Ser. No. 786,705
Int. Cl. B29c *17/07;* B29d *23/03*
U.S. Cl. 18—5                                4 Claims

ABSTRACT OF THE DISCLOSURE

Apparatus for blow molding hollow articles having offset pouring spouts, the apparatus having an articulated blow stick which may be placed in a first position to engage a parison and then moved to a second position as the mold halves close around the parison.

---

This application is a divisional application of copending application Ser. No. 576,605, filed Sept. 1, 1966.

This invention relates to an apparatus for blow molding containers of asymmetric configurations. More particularly, this invention concerns an apparatus for blow molding containers having offset pouring spouts.

The development of blow molded plastic bottles, jugs and other containers has substantially followed the advantages and disadvantages inherent in the process. Blow molding of bottles involves the extrusion between opened mold sections of a substantially cylindrical parison of heated polymeric material. A blow stick is positioned in one end of the parison and the mold sections are closed around the parison. The closing mold sections seal the parison around the blow stick to form the pouring spout at one end and seal the other end of the parison to form a container. A fluid such as air is injected through the blow stick to expand the parison into intimate contact with the mold cavity. After the plastic material is cooled and set in a shape conforming to the mold cavity, the mold sections are opened and the article removed.

It will be noted that in its most elementary form, blow molding involves a parison which is substantially symmetrical around a center line and a mold cavity which is also substantially symmetrical around such center line. In the case of containers, the pouring spout is most conveniently positioned coaxial with the center line. Thus, as the parison is expanded to form the container, wall thickness is diminished evenly and a symmetrical container having substantially constant wall thickness is readily formed. The advantages of this approach have accounted for the great use of esthetically pleasing blow molded thermoplastic bottles.

Unfortunately, a symmetrical container becomes less desirable as the size of the container increases. Though the "unbreakable" feature of blow molded polymeric containers has resulted in a widespread use of large blow molded containers for such liquid products as soaps and bleaches, it is generally recognized that conventional round containers having symmetrical pouring spouts are space-wasting in storage, cumbersome to carry and present pouring problems.

Dike U.S. Patent 3,214,052, issued Oct. 26, 1965, discusses in more detail the inadequacies of large round symmetrical bottles and discloses a container of improved design which avoids these inadequacies. Briefly, the disclosed bottle is square in shape with a carrying handle over the center of gravity. A pouring spout is positioned at one corner of the square cross section and is disposed at about 45 degrees to the nominal center line of the container.

While the advantages in use of the container described in this patent are real, the production of such a container by blow molding is indeed complicated. For instance, if the conventional approach of positioning the mold with the outlet spout at the bottom of the mold cavity is employed, the center line of the parison will be a diagonal of the mold cavity. Obviously, the problem of varying the wall thickness of the parison to permit a container of reasonably constant wall thickness renders this approach impractical. A square bottle such as that of the above-mentioned Dike patent would be even more difficult to produce.

On the other hand, if the center line of the parison coincides substantially with the center line of the container, as defined by the mold cavity, the parison would have to be of a diameter approaching the final size of the container to permit positioning of a conventional blow stick within the parison. Clearly, blow molding of containers with offset pouring spouts presents a very difficult problem.

It is an object of this invention to provide an apparatus for blow molding containers having offset pouring spouts.

Another object of this invention is to provide an apparatus for blow molding containers having offset pouring spouts utilizing parisons of diameters substantially less than that of the finished container.

Yet another object of this invention is to provide an apparatus for blow molding containers having offset pouring spouts wherein the center line of the parison coincides substantially with the nominal center line of the mold cavity.

According to the instant invention, a laterally movable, or tiltable, blow stick is employed to blow mold containers having offset pouring spouts. Thus, except for minor adjustments in the area which forms the pouring spout, the parison is extruded and positioned much as it would be for a similar container having a pouring spout conventionally positioned at the top of the container and substantially coaxial with the center line of the parison. The preferred tiltable blow stick is initially positioned to enter the open end of the parison when tilted from the "open mold" position to the "closed mold" position. Before the mold sections are closed, the blow stick is moved to the "closed mold" position in which the blow stick is coaxial with the pouring spout portion of the closed mold sections. This tilting movement causes the blow stick to enter and engage the parison. When the mold sections close over the repositioned blow stick, the top portion of the container, apart from the pouring spout, is sealed in a manner analogous to the sealing of the parison at the bottom of the container and an offset pouring spout is formed around the blow stick. Except for the addition of the tiltable blow stick, containers having offset pouring spouts can be produced utilizing technology little more complicated than that used in producing containers with conventional top position pouring spouts.

Articulation of the blow stick, mechanisms to laterally move the blow stick, and the inclusion of additional sequence controls, constitute the basic modifications to a conventional blow molding apparatus. Of course, appropriate molds and proper programming must be employed. These requirements are well within the skill of the art.

The apparatus of the invention will be more fully understood with reference to the accompanying drawings, in which:

FIGURE 1 is an overall view of the invention and associated apparatus;

FIGURE 2 is a view showing the relationship between the tiltable blow stick and open mold sections;

FIGURE 3 is a view showing the relationship between the parison and the "open mold" position of the tiltable blow stick;

FIGURE 5 is a view showing the relationship between the parison and the tiltable blow stick in the "closed mold" position.

Figure 4:
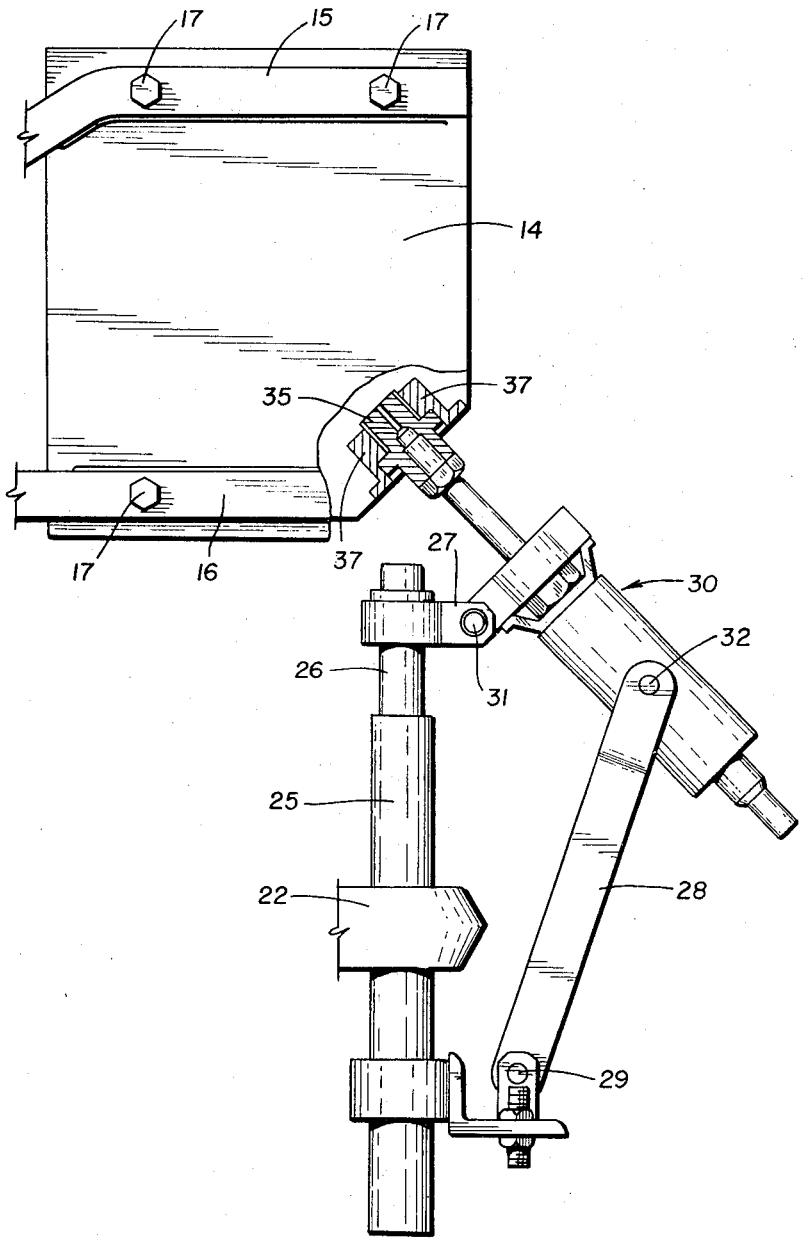
FIGURE 4 is a partial cutaway view showing the relationship between the tiltable blow stick and the closed mold sections.

As shown in FIGURE 1, a base 10 has supported thereon vertical supports 11 and 12. A movement means 13, which may be a hydraulic cylinder, a pneumatic cylinder, an electric motor, or other prime mover, is linked to mold section 14 by means of linking arms 15 and 16. Bolts 17, or other means, are employed to attach mold section 14 to linking arms 15 and 16. Yet another mold section, not shown, is similarly supported by linking arms 18 and 19. Thus, movement generated by movement means 13 is transmitted through rod 20 to linkage 21 to cause linking arms 15, 16, 18 and 19 to move the mold sections together or apart. This mechanism is conventional and may be replaced with any other conventional mechanism for moving the mold sections in a well-understood manner. A more detailed description of the apparatus appears in U.S. Patent 3,257,687.

A more novel aspect of the apparatus is that supported to base 10 by horizontal support arms 22 and 23. Fixedly attached to horizontal support arms 22 and 23 is a blow stick tilting means 24. In a preferred embodiment, this takes the form of a pneumatic cylinder 25 which is directly supported by horizontal support arms 22 and 23. Disposed within pneumatic cylinder 25 is a movement rod 26 which carries upper link 27 in a rigid manner as shown. Lower link 28 is attached to pneumatic cylinder 25 in a pivotable manner by pin 29. Blow stick assembly 30 is pivotally attached to upper link 27 by pin 31 and similarly attached to the lower link 28 by pin 32.

As shown in FIGURE 2, blow stick assembly 30 is positioned in the "open mold" configuration by withdrawing rod 26 into pneumatic cylinder 25. Blow stick tip 35 would interfere with the mating of the mold sections, but this is immaterial since the mold sections are open when the blow stick assembly 30 is in the position shown in FIGURE 2.

The purpose of positioning blow stick assembly 30 in the "open mold" position is evident from FIGURE 3. It will be noted that blow stick tip 35 is located directly below parison 36. Parison 36 in turn is, in actual operation, appropriately located relative to the open mold sections in a conventional manner.

Before the mold sections are closed, blow stick assembly 30 is moved to the position shown in FIGURE 4. That is, rod 26 is extended from pneumatic cylinder 25 to move blow stick assembly 30 into a more vertical attitude and displace blow stick tip 35 both upwards from the "open mold" position and also toward the outside edge of the mold sections. In this "closed mold" configuration, blow assembly 30 is so positioned as to cooperate with mating surafces 37 which accommodate and seal blow stick tip 35 within the closed mold sections. This accommodation and sealing of the blow stick tip 35 within the mold sections is essentially the same as the normal accommodation in sealing up of a fixed attitude blow stick which may move linearly between the mold sections.

The significance of the change in the lateral position of blow stick assembly 30 becomes apparent upon consideration of FIGURE 5. As the blow stick tip 35 moves upward and outwardly, it moves into and engages the parison 36 in such a manner that a portion of parison 36 drapes over blow stick tip 35. This draped portion 38 is sealed around blow stick tip 35 by sealing surfaces 37 as the mold sections close. The remainder of parison 36 is sealed by the pinching action of the closing mold sections. As will be apparent, the draped portion 38 forms an offset opening or spout around blow stick tip 35. The main portion of the mold cavity, of course, is conventionally placed so that the opening or spout around blow stick tip 35 is displaced and angled relative to the main portion of the mold cavity in a manner similar to that at which blow stick tip 35 is displaced and angled relative to the mold cavity.

From the above discussion, it will be apparent that the instant invention provides an apparatus for blow molding bottles having offset and/or angled spouts. If desired, it is, of course, practical to mold a handle on the top of the bottle since the spout is no longer located in this area. Further, the bottle may be made square or round, according to whichever is desirable, by appropriately dimensioning of the mold cavity.

In simple terms, the instant invention involves an apparatus having a movable or tiltable blow stick assembly including means for moving the blow stick into an "open mold" configuration in which the blow stick is positioned below the normally extruded parison. Also, the means can position the blow stick assembly in a "closed mold" position wherein the blow stick is positioned to be accommodated by the closed mold sections. It is critical that, during the transition from the "open mold" configuration to the "closed mold" configuration, the blow stick enters and engages the parison in order that the closing mold sections will seal the parison around the blow stick to form a spout and also seal the remainder of the opening parison either into a simple container top or one having the handle formed.

Many means can be employed to tilt the blow stick. Hydraulic, pneumatic, eccentric, crankshaft, or numerous other mechanisms known to those skilled in the art are capable of accomplishing the desired movement. However, the illustrated and described linkage is particularly advantageous.

The instant invention permits the blow molding of containers having offset spouts by, for the most part, conventional means including moderately sized parisons extruded substantially concentric with the center line of the mold cavity.

From the above description, it is apparent that various modifications in the apparatus disclosed herein may be made while remaining within the scope of the invention. Therefore, the invention is not intended to be limited by the specific apparatus set forth except as may be required by the following claims.

What is claimed is:

1. In an apparatus for blow molding hollow articles having offset pouring spouts, which apparatus includes a sectional mold movably supported to open and close the sections, said sectional mold defining a mold cavity in the shape of said article having an offset pouring spout, the improvement comprising a blow stick pivotally mounted on support means and means for pivoting said blow stick laterally from a position centrally below said mold cavity to a position concentric with said pouring spout portion of said mold cavity.

2. Apparatus as set forth in claim 1 wherein said means for moving said blow stick comprise, a fluid activated cylinder and piston assembly, said cylinder and piston being fixedly supported at one end and connected to said support means at the other end whereby said blow stick may be moved by increasing or decreasing the amount of fluid in said cylinder and thereby altering the position of said piston in said cylinder.

3. Apparatus for blow molding hollow articles having inclined offset spouts comprising, a sectional mold having a mold cavity defined therein, said mold cavity having a portion forming a female mold for the inclined spout, means for supporting and for opening and closing the mold sections, an articulated blow stick, means for supporting the blow stick, and means for moving the blow stick from a first position below the mold cavity to a second position coaxial with the inclined spout portion of the mold cavity.

4. Apparatus as set forth in claim 3 wherein said blow stick is pivotally mounted to a fluid-activated cylinder and piston assembly by means of a single pivotable joint at a point adjacent the blow stick tip and also by means of an elongated link attached to said cylinder by a pivotable joint at one end and to said blow stick, at a point more distant from the blow stick than said single joint, by a pivotable joint.

References Cited
UNITED STATES PATENTS

| | | |
|---|---|---|
| 2,930,079 | 3/1960 | Parfrey. |
| 3,091,803 | 6/1963 | Scott et al. |
| 3,408,692 | 11/1968 | Schaich. |

WILBUR L. McBAY, Primary Examiner

U.S. Cl. X.R.

264—94, 98